(12) United States Patent
Kathan

(10) Patent No.: US 7,062,950 B2
(45) Date of Patent: Jun. 20, 2006

(54) MEASUREMENT DEVICE

(75) Inventor: Benno Kathan, Wasserburg (DE)

(73) Assignee: i f m electronic GmbH, Essen (DE)

( * ) Notice: Subject to any disclaimer, the term of this patent is extended or adjusted under 35 U.S.C. 154(b) by 117 days.

(21) Appl. No.: 10/680,431

(22) Filed: Oct. 8, 2003

(65) Prior Publication Data

US 2004/0118181 A1    Jun. 24, 2004

(30) Foreign Application Priority Data

Oct. 8, 2002   (DE) ............................... 102 46 874

(51) Int. Cl.
*G01D 13/10*   (2006.01)
(52) U.S. Cl. ..................... 73/1.88; 73/866.3
(58) Field of Classification Search .............. 73/1.88; 338/87, 135; 374/198, 200; 116/291, 292, 116/294, 295
See application file for complete search history.

(56) References Cited

U.S. PATENT DOCUMENTS

| | | | | |
|---|---|---|---|---|
| 3,241,515 A | * | 3/1966 | Franklin | ..................... 116/295 |
| 3,621,811 A | * | 11/1971 | Hill | ............................. 116/292 |
| 4,298,946 A | * | 11/1981 | Hartsell et al. | ............. 700/278 |
| 4,337,822 A | * | 7/1982 | Hyltin et al. | ............... 165/265 |
| RE33,119 E | * | 11/1989 | Baker | ......................... 374/102 |
| 5,439,169 A | * | 8/1995 | Rabel | .......................... 236/94 |
| 5,613,819 A | | 3/1997 | Wehren | |
| 6,404,187 B1 | | 6/2002 | Rückert | |

FOREIGN PATENT DOCUMENTS

| | | |
|---|---|---|
| DE | 41 20 752 A1 | 1/1993 |
| DE | 196 16 658 A1 | 9/1997 |
| DE | 299 04 152 U 1 | 7/1999 |

* cited by examiner

*Primary Examiner*—Charles Garber
*Assistant Examiner*—Paul M. West
(74) *Attorney, Agent, or Firm*—David S. Safran

(57) ABSTRACT

A measurement device with a cylindrical housing (2), with a sensor element and with an adjustment element (6) made, for example, as a potentiometer, for setting at least one parameter of the measurement device. The measurement device (1) is especially easily and still accurately and reproducibly settable by there being at least one rotary adjustment ring, the adjustment ring being made as a housing sleeve (7) for setting the parameter.

14 Claims, 16 Drawing Sheets a) b)

a)   b)

a) b)

MEASUREMENT DEVICE

BACKGROUND OF THE INVENTION

1. Field of the Invention

The invention relates to a measurement device, especially for process measurement engineering, with a housing, with a sensor element and with an adjustment element, especially a potentiometer, for setting at least one parameter of the measurement device.

2. Description of Related Art

There are many applications for measurement devices for process measurement engineering. Thus, for example, the pressure, the temperature, the fill level, the flow velocity or the flow amount of gases, of liquid or solid media, but also of bulk material are monitored or measured. In doing so, there are a plurality of different measurement principles for determining the individual parameters. Thus, for example, the fill level of a liquid can be determined by means of ultrasound, radar or guided microwaves. In pressure sensors which are used for monitoring and measuring the system pressure in hydraulic and pneumatic applications, there are, for example, those with a capacitive measurement principle. These pressure sensors, as the sensor element, have a capacitive cylindrical pressure measurement cell which formed of a base body and a membrane which are held at a specific distance from one another and are joined hermetically tight to one another by a joining material, for example, brazing solder. Besides these pressure sensors which have a capacitive measurement principle, there are also pressure sensors which have a strain gauge (DMS) or DMS resistors as the sensor element. In these pressure sensors, the DMS resistors are applied to the side of the membrane facing away from the medium, the resistance value of the DMS resistors depending on the sagging of the membrane, and thus, likewise being a measure of the pressure on the membrane.

The individual measurement methods have different advantages and disadvantages specific to the application. In order to meet the partially very different needs of the individual users, therefore a very great diversity of types of measurement devices is necessary; due to small numbers and high warehousing costs, this leads to a high final cost for the measurement devices. The diversity of types is further increased in that, on the one hand, there are so-called compact devices in which the measurement unit and the evaluation device are jointly accommodated in a housing, and on the other hand there, are those measurement devices in which the evaluation device is spatially separate from the measurement unit and is connected to it via a connecting cable.

It is common to both types of measurement devices that it is frequently necessary or at least desirable to be able to set at least one parameter of the measurement device as much as possible on site. The parameter which is to be set can be, for example, the operating point. Likewise, by inputting two operating points, the measurement range of the measurement device can be adjustable. In addition to one or more adjustable operating points, it can also often be necessary to adjust a value for the hysteresis. In addition to the operating point or limits of the measurement range, the parameters which are to be set can also include the choice of a certain medium, a temperature range or a time delay.

In simple and thus relatively economical measurement devices, the parameter is generally set via a potentiometer which is located in the housing and which has a setscrew which is accessible from the outside. The setscrew can be actuated with a normal slotted or Phillips head screwdriver. These potentiometers are available in a variety of versions so that setting the parameter of the measurement device using the corresponding potentiometer can be very simple and economical. However, the disadvantage in using a potentiometer for setting a parameter is that accurate and reproducible setting of the parameter is not possible solely with a potentiometer.

For this reason, in the meantime, there are a host of measurement devices in which the measurement unit and the evaluation device are accommodated jointly in a housing, the evaluation unit having especially an indication and setting display. With these displays on, the one hand, accurate and reproducible setting of a parameter via the corresponding keys is possible, and on the other hand, in addition to the actual measurement values, the adjusted parameter can also be indicated using a display. However, these displays, which often have a LCD display or a bar graph, are relatively expensive, and moreover, require additional room which is only very conditionally available in so-called compact devices. In addition, these displays have the disadvantage that they increase the power consumption of the measurement devices overall; this is especially disadvantageous in 2-lead devices.

Published German Patent Application Nos. DE 41 20 752 and DE 196 16 658 disclose a cylindrical pressure measurement device with a lower part which is provided with a receiver, with an upper part and with an indication and adjustment display. These pressure measurement devices are, for example, screwed into pressure vessels or into gas- or liquid-carrying pipelines, forming a seal. When such a measurement device is screwed into a wall, the resulting angular position then depends on the torque with which the measurement device lower part is screwed into the wall. The resulting angular position can be unfavorable since in this angular position the electric leads, the display or control keys are only accessible with great difficulty or not accessible at all. To align the measurement device upper part such that the electric leads, the display or control keys are easily accessible, the measurement device upper part can be turned relative to the measurement device lower part around the lengthwise axis of the measurement device lower part. In this way, good readability of the display and good accessibility of the control keys are possible, but special measures are necessary to achieve adequate axial fixation. In addition, there are the problems of the space required by the display and the additional power consumption.

SUMMARY OF THE INVENTION

Therefore, a primary object of this invention is to provide a measurement device in which economical but also accurate adjustment of a parameter is possible, and in addition, the adjusted parameters will be readable as easily as possible for the user.

This object is first achieved in the initially described measurement device with a cylindrical housing essentially in that, for setting at least one parameter, there is at least one rotary adjustment ring, the at least one adjustment ring being made as a housing sleeve. Because the adjustment ring is made as a housing sleeve, it is both easily accessible so that the parameter can be comfortably set, and also easily visible so that the set value can be easily read. Because the adjustment ring is made as a housing sleeve, the adjustment ring can thus have maximum dimensions without increasing the dimensions of the measurement device overall. Thus, in accordance with the invention, the area of the cylindrical housing which is not otherwise used is used to enable simple and comfortable adjustment of the parameter.

Advantageously, the housing and/or the housing sleeve has at least one scale. By attaching the scale to the housing or the housing sleeve, the readability of the set parameter is good. When the scale is mounted on the housing, the housing sleeve is at least partially made of transparent material, so that the scale is not covered by the housing sleeve.

Basically, there are various possibilities for how the position of the housing sleeve can be transmitted to the adjustment element. In particular, the position can be transmitted by electronic or electromagnetic means, for example, by inductive or capacitive transmission of the position of the housing sleeve to the adjustment element. However, optical position transmission is also likewise possible.

According to one preferred embodiment of the invention, the transmission of the position of the housing sleeve to the adjustment element takes place mechanically. To do this, the housing sleeve has internal teeth, and within the housing, there is a gear with corresponding external teeth, the gear interacting with the adjustment element. In particular, the gear or rack is connected via a shaft to the adjustment element. If the adjustment element is a commercial potentiometer, the end of the shaft is a made as a blade which fits into the corresponding slot of the setscrew of the potentiometer.

There are various possibilities for mechanical position transmission of the housing sleeve to the adjustment element. According to the first embodiment of the invention, the internal teeth are made axially on the housing sleeve and the axis of the gear is located parallel to the lengthwise axis of the housing so that the external teeth of the gear are aligned axially. According to one alternative embodiment of the invention, the internal teeth are located radially on the housing sleeve and the axis of the gear is located perpendicular to the lengthwise axis of the housing so that the external teeth of the gear are aligned radially. Both embodiments have the advantage that, by a corresponding choice of gears and the inside teeth of the housing sleeve, a gear ratio can be set between the internal teeth of the housing sleeve and the gear so that one revolution of the housing sleeve corresponds to several revolutions of the gear. Thus, for example, a multi-turn potentiometer can be used as the adjustment element.

Finally, according to a third embodiment of the invention, it is provided that a journal which projects into the interior of the housing is formed on the housing sleeve, the journal interacting directly or via one or more shafts with the adjustment element. The end of the journal can be made as a blade which then fits directly into the screw slot of the setscrew of the adjustment element which is made as a potentiometer. In addition, a speed-transforming gear, for example, a planetary gear, can be located between the journal and the adjustment element, by which a multi-turn potentiometer can also be used here.

In order to prevent unwanted shifting of a parameter, it is advantageously provided that the housing sleeve can be locked. The housing sleeve can be locked, for example, by there being another sleeve which extends at least partially over the housing sleeve so that the housing sleeve is not accessible with the sleeve pushed on. In order to be able to read a set parameter value on the scale of the housing sleeve even with the sleeve slipped on, the sleeve is preferably made of transparent material, and moreover, the sleeve can have a magnifier, at least in areas, for better readability of the set parameter.

According to one alternative approach of the invention, to set the parameter of the measurement device, there is at least one slide which can be moved in the lengthwise direction of the housing, the slide being connected to the adjustment element and at least one lengthwise slot being formed in the housing to guide the slide. This configuration is preferably accomplished, for example, in a housing which is rectangular. However, basically, the slide can also be used in a cylindrical housing. Because the slide is located directly on the housing, the slide can have relatively large dimensions without significantly increasing the dimensions of the measurement device overall. Thus, in accordance with the invention, in this approach, the area of the cylindrical housing which is not otherwise used is used to enable simple and convenient adjustment of the parameter.

For simple readability of the set parameter value, there are several display elements in the housing, especially several LEDs for displaying the current measured value and the set parameter value. In this way, a user can read at a glance directly on site, i.e., on the measurement device, both the current measured value and also the set parameter value, for example, a set operating point. The current measured value can be distinguished from the set parameter value, for example, by the display of the current measured value and the display of the set parameter value taking place with different colors. Alternatively, it is also possible to display the set parameter value by blinking.

In order to prevent unintentional shifting of the set parameter, it is advantageously provided that there is a detachable or hinged cover cap on the side of the housing on which there are a slide or slides. If the cover cap is made as a separate part, it is slipped onto the side of the housing and is fixed, for example, using the corresponding catch elements. Alternatively, the cover cap can also be hinged on one side of the housing. When the cover cap is fixed or locked on the housing, the slide or slides are not accessible, so that unintentional shifting of the parameter is prevented. In addition, the cover cap is also used as protection against dirt or against damage to the slide. Thus, with the cover cap locked, both the current measured value and also the set parameter value can be read, the cover cap is preferably made of a transparent material.

In particular, there is now a plurality of possibilities for embodying and developing the measurement device in accordance with the invention. In this regard, the invention is described in further detail below in conjunction with the accompanying drawings.

DETAILED DESCRIPTION OF THE INVENTION

Figure 14:
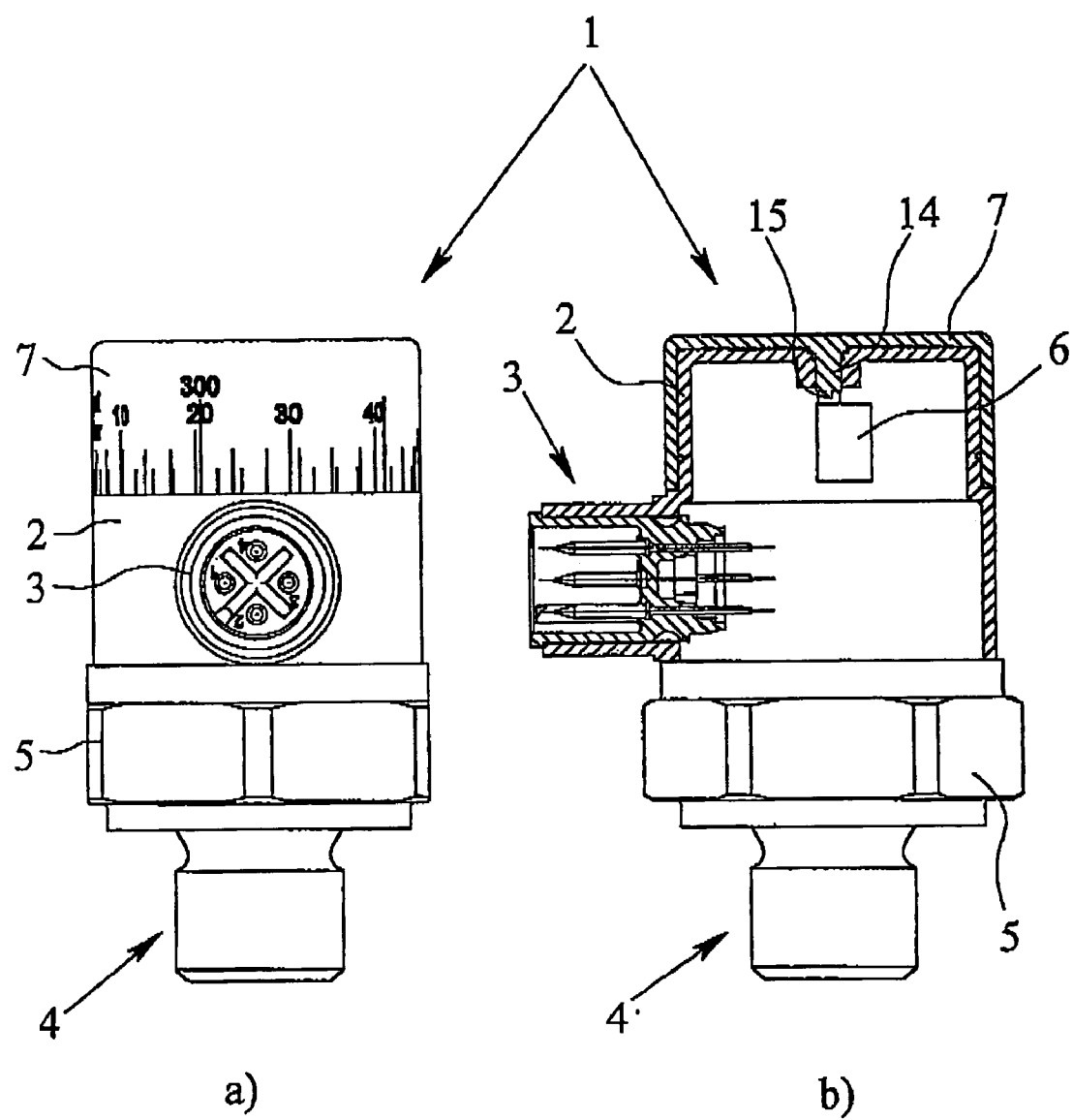
Figure 15:
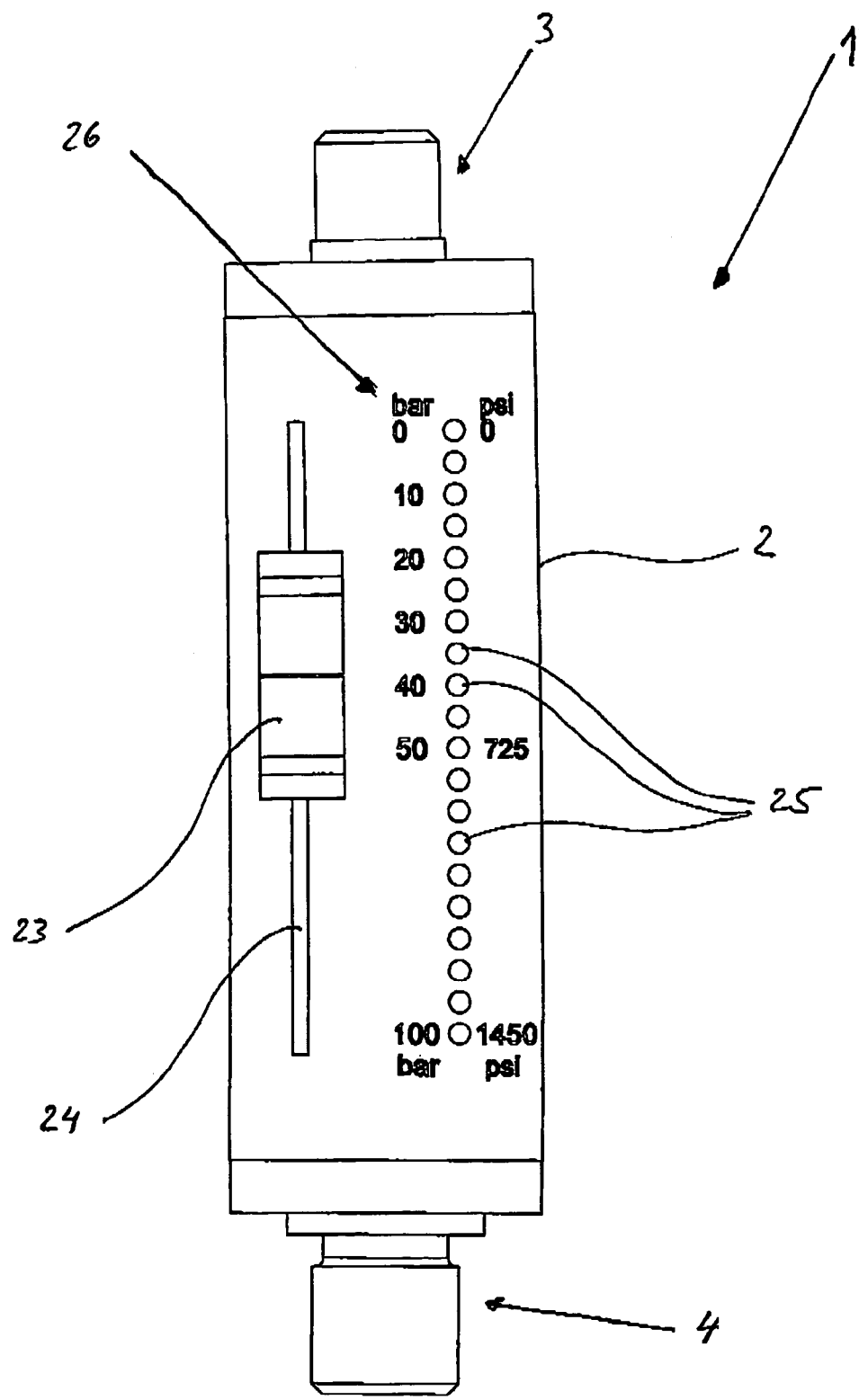
FIG. 15 is an elevational view of a first embodiment of a measurement device as in accordance with the invention with a rectangular housing.
Figure 16:
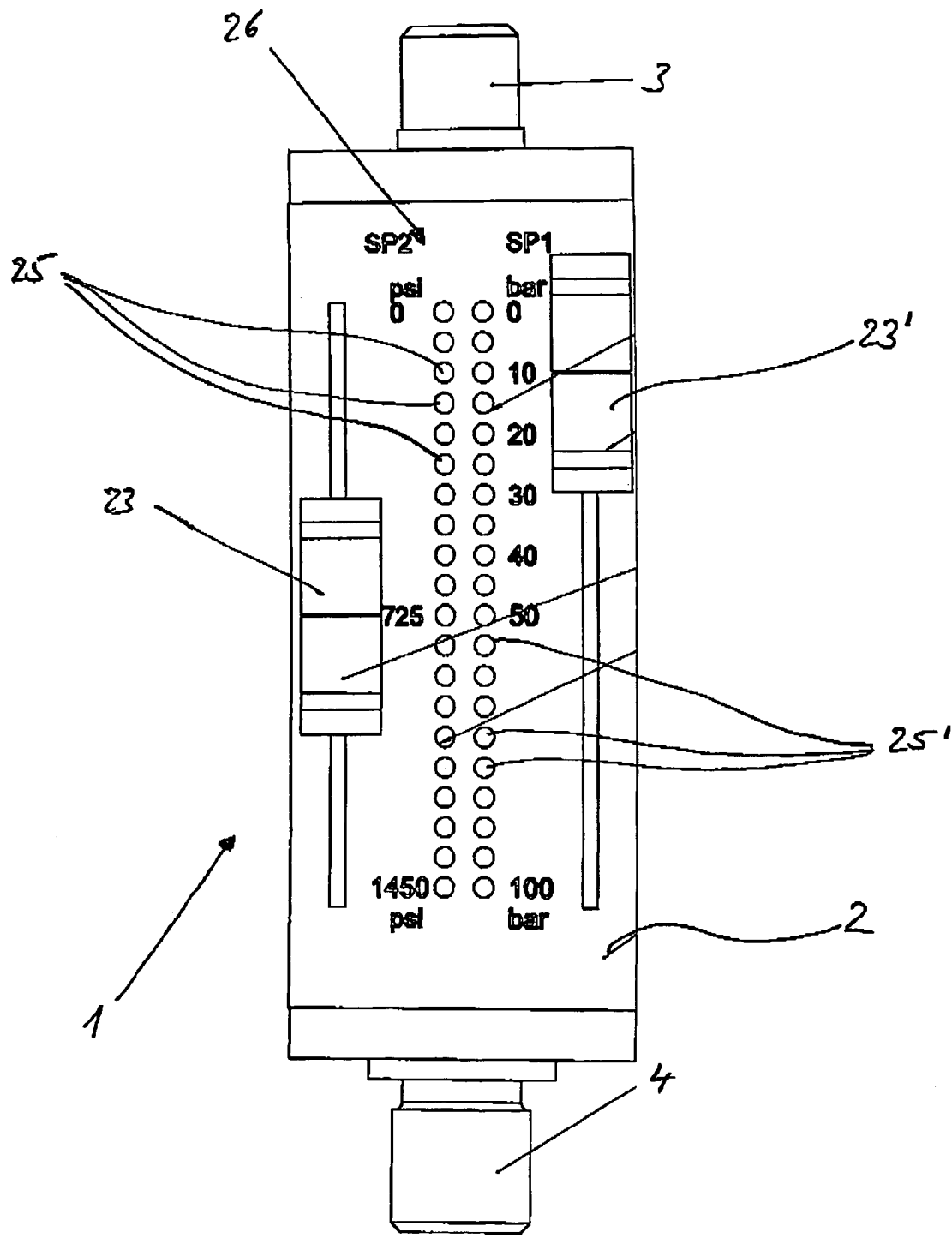
FIG. 16 is an elevational view of a second embodiment of a measurement device of the invention with a rectangular housing, from the front.
Figure 17:
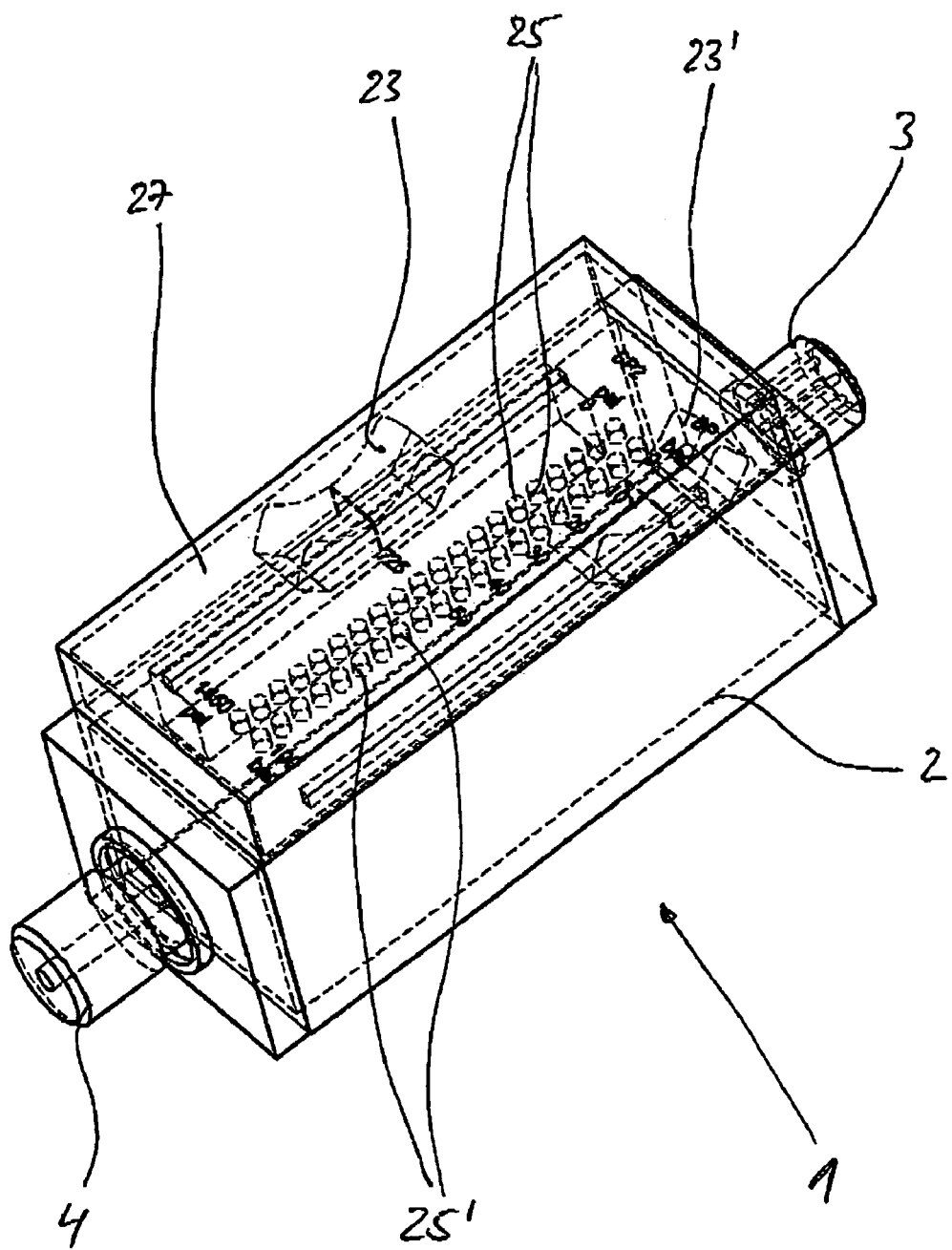
FIG. 17 is a perspective of the measurement device of FIG. 16, with a cover cap.

The figures show different embodiments of a measurement device 1 of the invention, and the measurement devices 1 shown here can be, for example, a flow sensor or monitor, a pressure sensor or a temperature sensor. The invention is independent of the type of measurement device 1, especially of which type of sensor element is provided in the measurement device 1. The sensor element is chosen such that the desired measurement value can be measured. According to which physical principle the measurement is taken plays no part here. FIGS. 1 to 14 each show a measurement device 1 with a cylindrical housing 2 and FIGS. 15 to 17 show a measurement device 1 with a rectangular housing 2.

The measurement device 1 has a cylindrical or a rectangular housing 2 with a plug connection 3 and a process connection 4. Via the plug connection 3 electrical supply of the measurement device 1 and optionally the electrical connection of the measurement device 1 to a higher control unit take place. Instead of the plug connection 3 of course there can also be a cable connection. The housing 2 which forms the upper part of the measurement device 1 is connected securely and tightly to the process connection 4 which forms the lower part of the measurement device 1. Using the threaded process connection 4, the measurement device 1 can be connected to a pipe or a container in which the medium which is to be monitored is located. For this purpose, the process connection 4 has a hexagon 5 so that the measurement device 1 can be easily screwed into a hole in the pipe or in the housing.

Depending on the type of measurement device 1, within the housing 2 there is a corresponding sensor element (not shown) and optionally other electronic elements and evaluation elements, especially a microprocessor. In addition, the measurement device 1 also has an adjustment element 6 which can be, for example, a commercial single-turn or multi-turn potentiometer. Using this adjustment element 6, it is possible to set at least one parameter of the measurement device 1, for example, the operating point or the hysteresis of the measurement device 1.

According to the invention, to set the parameter in a measurement device 1 with a cylindrical housing 2, there is at least one rotary adjustment ring, the at least one adjustment ring being made as the housing sleeve 7. The housing sleeve 7 is thus a component of the outside housing of the measurement device 1, the housing sleeve 7, however, being made as a separate part in addition to the actual cylindrical housing 2. In this way, on the one hand, the rotational capacity of the housing sleeve 7 necessary for setting the parameter can be implemented rather easily without the need for special precautions with respect to the tightness of the measurement device 1. Likewise, the choice of the material of the housing sleeve 7 can be made independently of the choice of the material of the sleeve-shaped housing 2.

Figure 4:
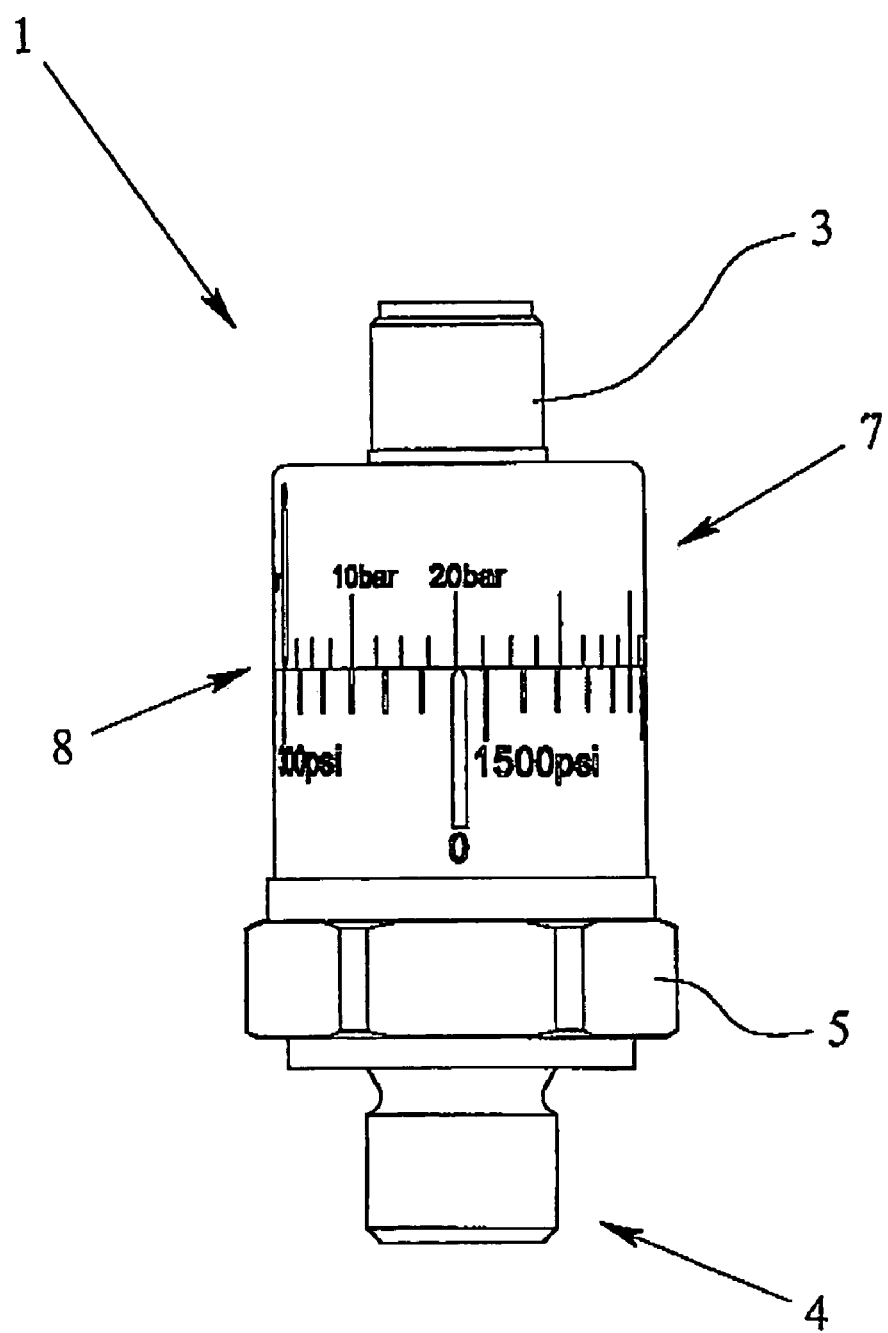
FIG. 4 is a view corresponding to that shown in FIG. 1, but enlarged and showing the provision of two different measurement scales.

For simple adjustability and readability, a scale 8 is applied to the housing and/or to the housing sleeve 7. As is apparent in FIG. 1a, the scale 8 can also be made as a "double scale", i.e., the labeling of the scale 8 can be done in two units. If, for example, in a pressure measurement device for the pressure to be measured the two units "bar" and "psi" are to be used, the scale 8 for the two units can also be applied separately to the housing 2 and the housing sleeve 7 for the two units, as is shown in the measurement device 1 as shown in FIG. 4.

In the embodiments of the measurement device 1 shown in FIGS. 1 to 14, the position of the housing sleeve 7 is transmitted to the adjustment element 6 mechanically. With the exception of the embodiment as shown in FIG. 14, the housing sleeve 7 has internal teeth 9 and inside the housing 2 there is a gear 10 with corresponding external teeth, the gear 10 being connected via a shaft 11 to the adjustment element 6 which is made as a potentiometer.

In the embodiment of the measurement device 1 as shown in FIGS. 1 and 4 and 7 to 9, the internal teeth 9 are made axially relative to the housing sleeve 7, and the shaft 11 of the gear 10, and thus, also the axis of the gear 10 is parallel to the lengthwise axis of the measurement device 1 or of the housing 2. As is especially apparent from FIG. 3, the end 12 of the shaft 11 which is remote from the gear 10 is made like a screwdriver blade so that this end 12 fits easily into the screw slot of the setscrew 13 of a commercial potentiometer. A suitable selection of the gear ratio between the internal teeth 9 of the housing sleeve 7 and the external teeth of the gear 10, for example, a transmission ratio of from 1 to 10, can result in that, when the housing sleeve 7 turns one revolution, the gear makes several, for example, 10, rotations. A stop which is located on the housing sleeve 7 or the housing 2 provides for the maximum path of rotation of the housing sleeve being limited and thus for preventing the adjustment element 6 made as a potentiometer from being excessively turned.

Figure 7:
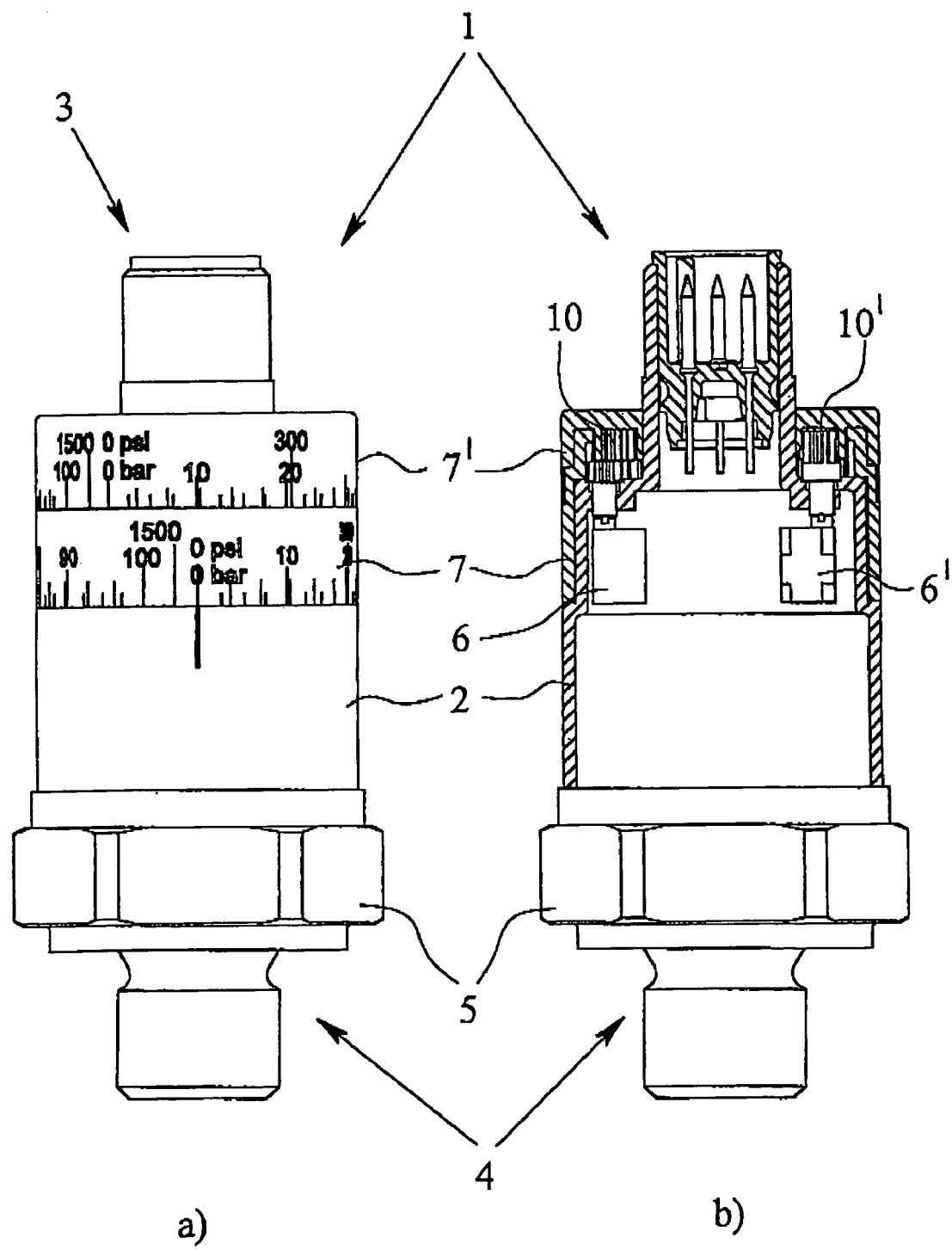
FIGS. 7a & 7b show, respectively, an elevational view and a partially sectioned view of a third embodiment of a measurement device in accordance with the invention with a cylindrical housing.
Figure 8:
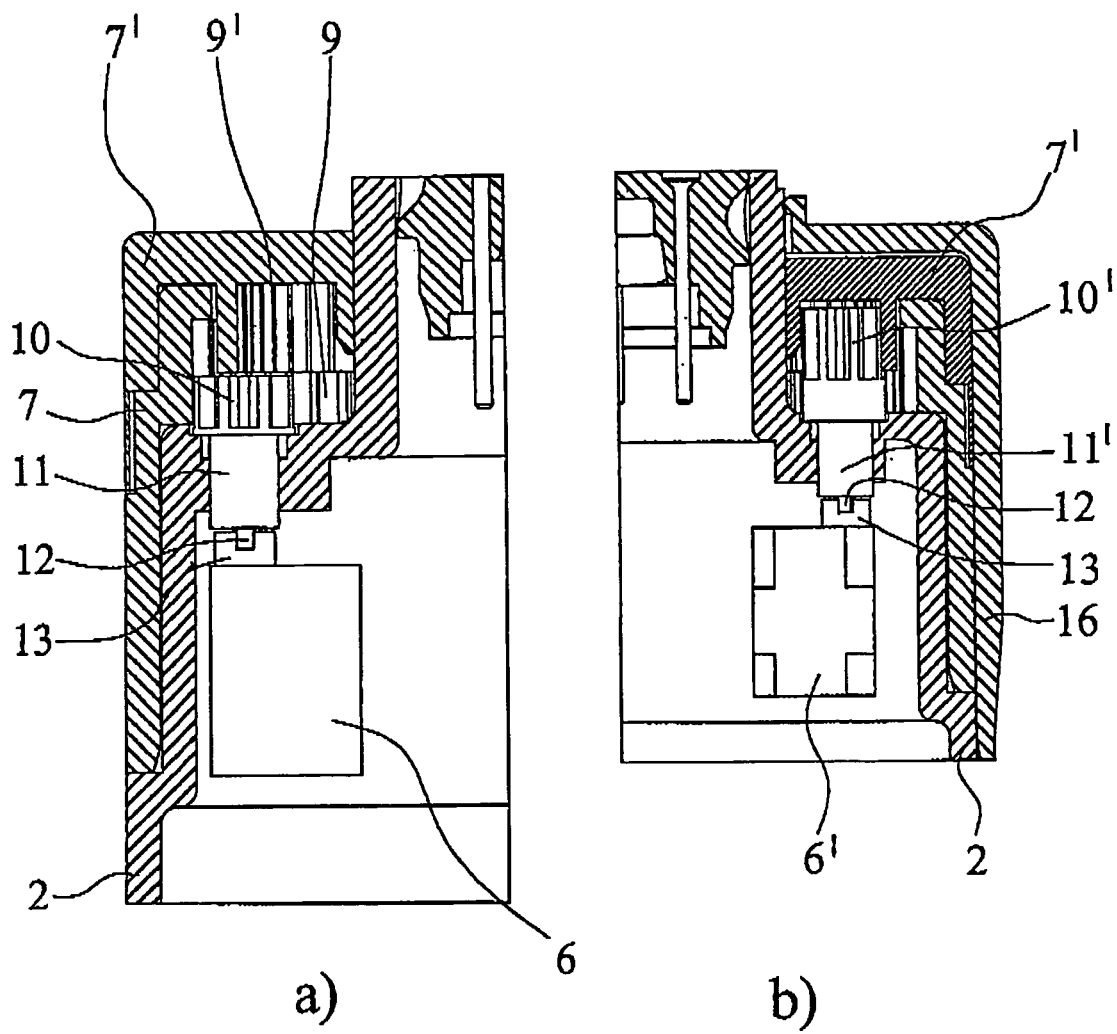
FIGS. 8a & 8b show, respectively, an enlargement of details of the upper left and upper right quadrants of measurement device as shown in FIG. 7.
Figure 9:
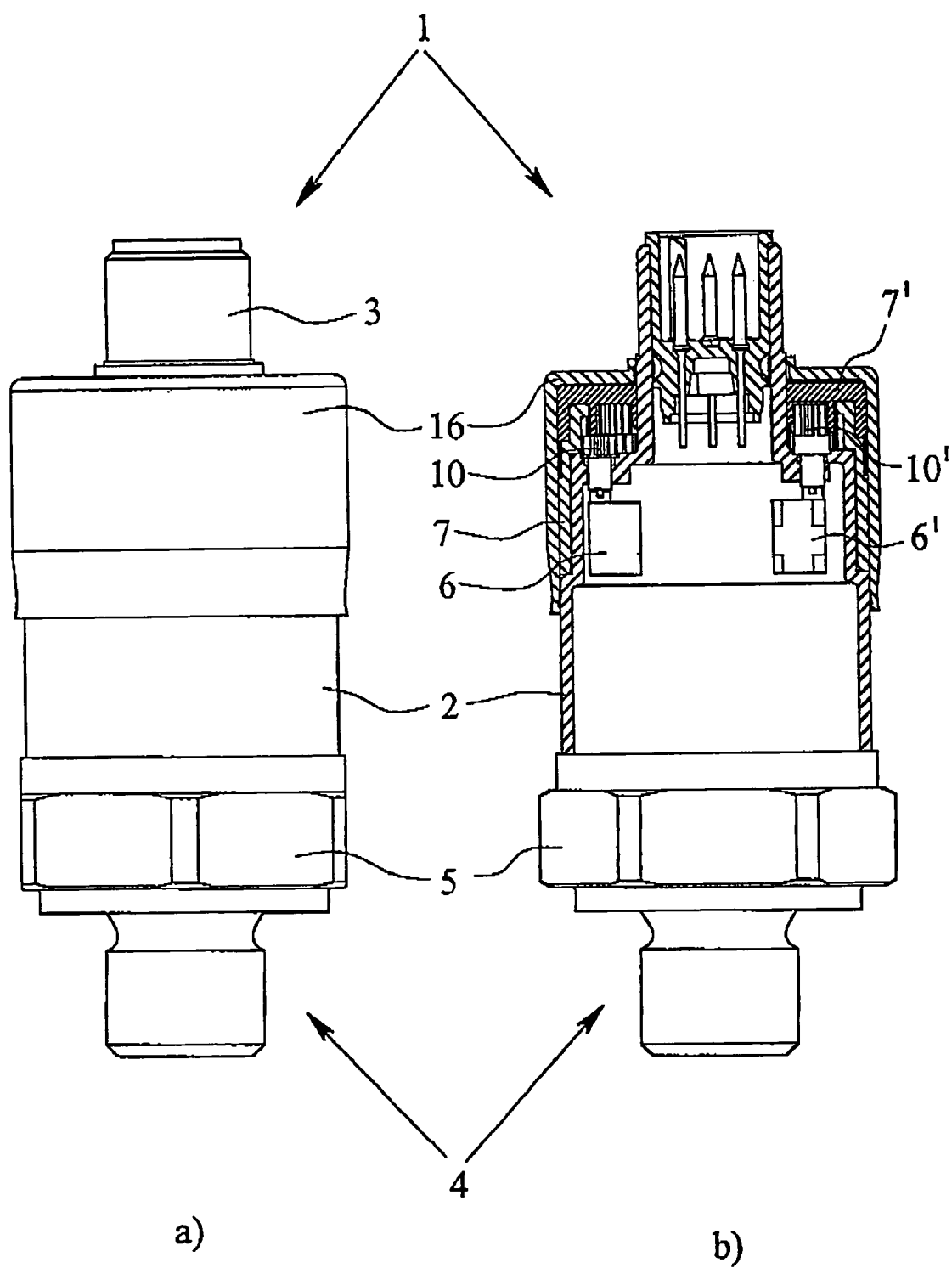
FIGS. 9a & 9b shows a modified version of the measurement device as shown in FIGS. 7a & 7b, respectively.

In contrast to the embodiment of the measurement device 1 as shown in FIGS. 1 to 4, the measurement device 1 as shown in FIGS. 7 to 9 has two housing sleeves 7, 7' and two gears 10, 10' so that, in this measurement device 1, two parameters can be set. For example, in a measurement device 1 made as a pressure measurement device, the minimum and maximum allowable pressure of the medium which is to be monitored can be set via the two housing sleeves 7, 7'. FIGS. 7 & 8 show that the internal teeth 9, 9' of the two housing sleeves 7, 7' are arranged concentrically relative to one another so that the two sets of internal teeth 9, 9' interact with the two gears 10, 10' independently of one another. For this reason, the two gears 10, 10' are located axially and radially offset relative to one another. The two gears 10, 10' each fit via a single shaft 11, 11' into an adjustment element 6, 6' which is made as a potentiometer.

Figure 1:
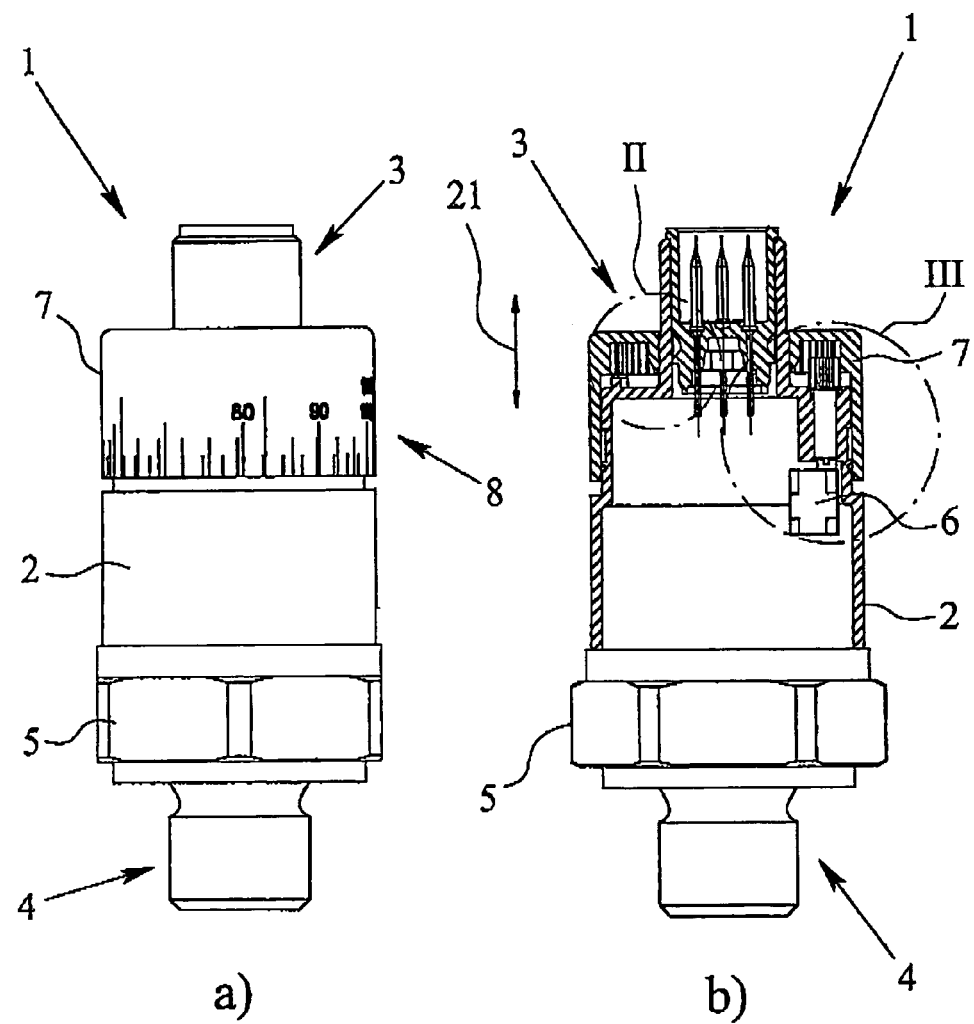
FIGS. 1a and 1b are, respectively, a lengthwise elevational view and a partially sectioned view of a first embodiment of a measurement device in accordance with the invention with a cylindrical housing.
Figure 5:
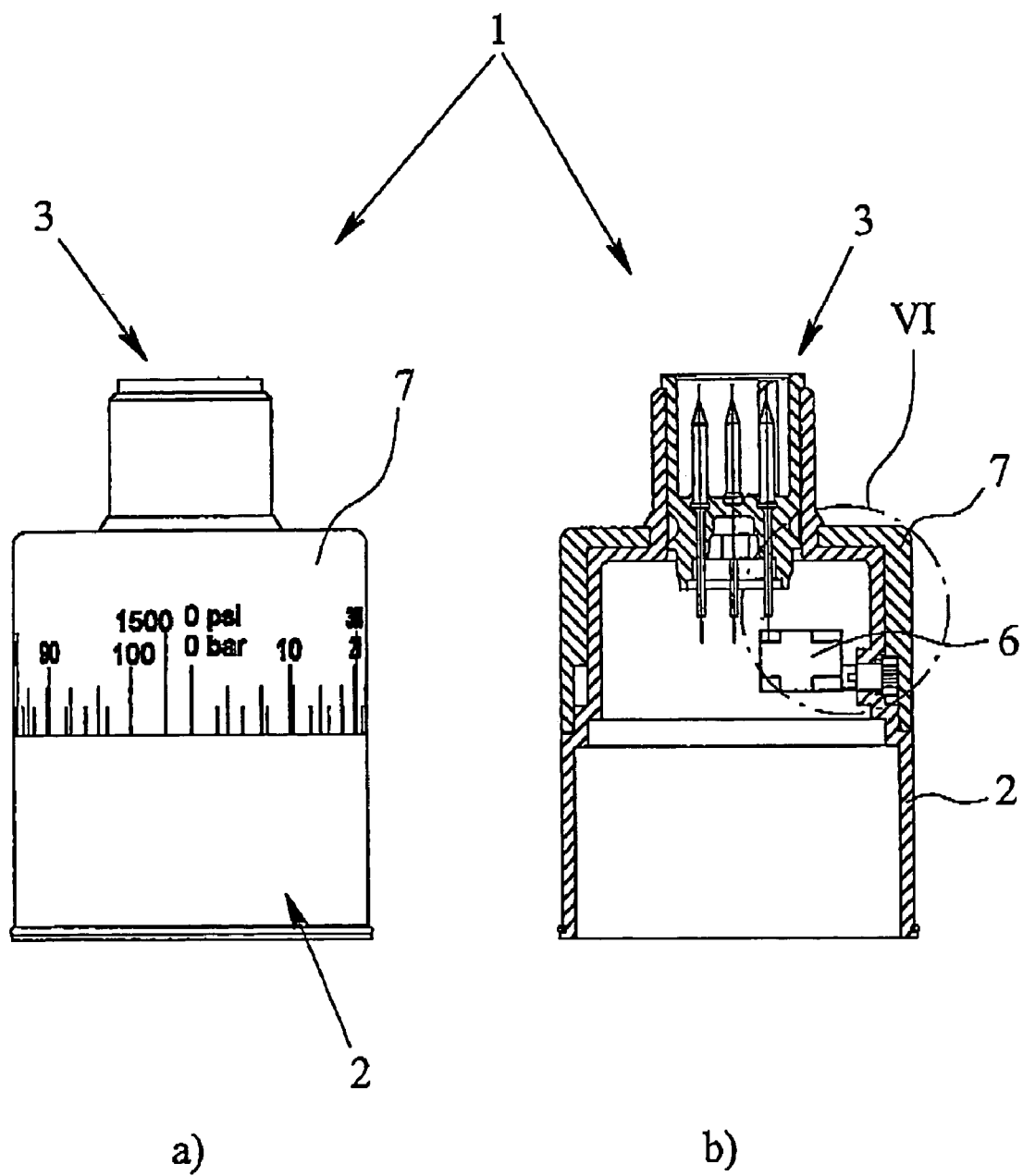
FIGS. 5a & 5b, respectively, show an elevational view and a partially sectioned view of a second embodiment of a measurement device according to the invention with a cylindrical housing.

In the embodiments of the measurement device 1 of the invention shown in FIGS. 5, 6 and 10 to 13, an alternative implementation of the transmission of the position of the housing sleeve 7 relative to the adjustment element 6 is shown. Here, the internal teeth 9 in the housing sleeve 7 and the external teeth of the gear 10 are made radial and the axis of the gear 10 is perpendicular to the lengthwise axis of the measurement device 1 or of the housing 2. In contrast to the embodiment as shown in FIG. 1, in the embodiment as shown in FIG. 5, thus, the mechanical components for position transmission are located turned by 90°. Regardless thereof, however, in this embodiment, the gear 10 is also connected via a shaft 11 to the adjustment element 6, the end 12 of the shaft 11 being made as a screwdriver blade for fitting into the corresponding screw slot of a setscrew 13 of the adjustment element 6.

Figures 3, 6:
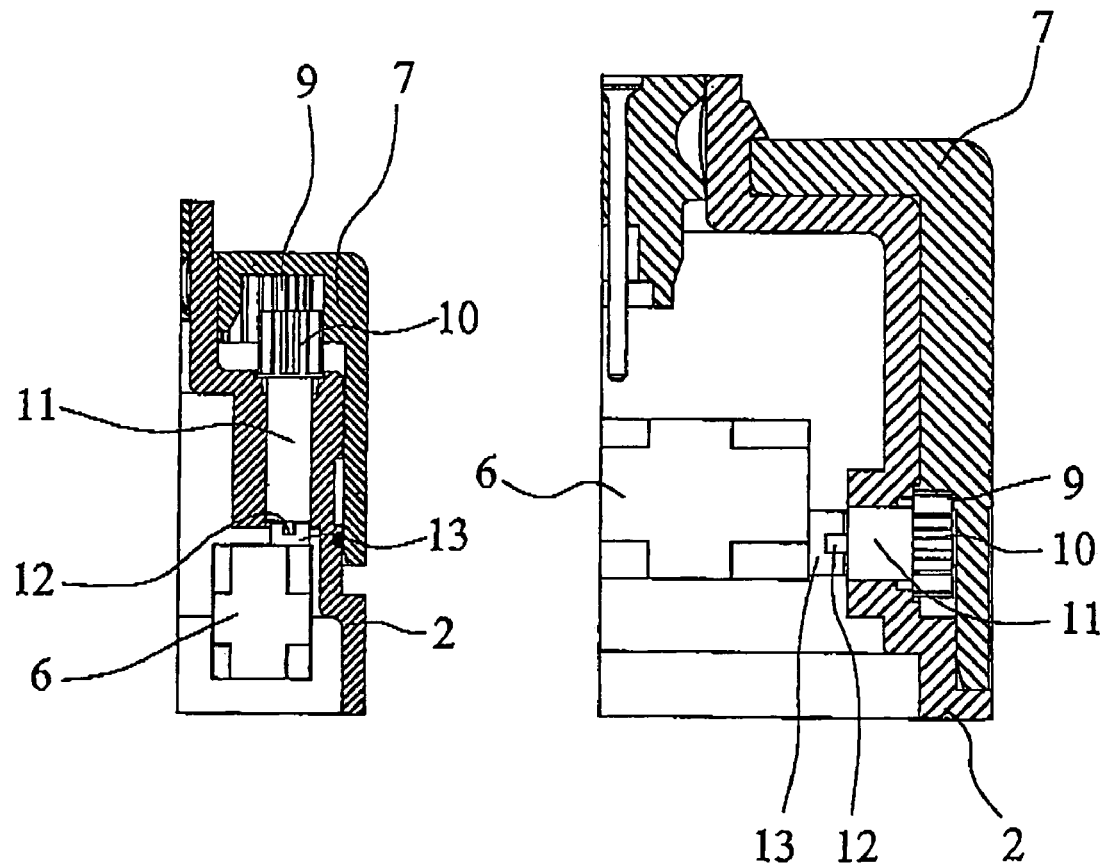
FIG. 3 shows an enlargement of detail III of the measurement device shown in FIG. 1.
FIG. 6 shows an enlargement of detail VI of the measurement device as shown in FIG. 5, in a section.

While in the measurement device 1 as shown in FIGS. 5 and 6 there is only one housing sleeve 7 and also only one gear 10, the measurement devices 1 as shown in FIGS. 10 to 13 each have two housing sleeves 7, 7' and two gears 10, 10' which are assigned to the two housing sleeves 7, 7'. Here, both the housing sleeves 7, 7' and the sets of internal teeth 9, 9' made on them as well as the gears 10, 10' are arranged axially offset to one another. In this way, it is, in turn, ensured that the two housing sleeves 7, 7' can be turned independently of one another, and thus, the two adjustment elements 6, 6' can be adjusted likewise independently of one another via the two gears 10, 10'.

Figure 10:
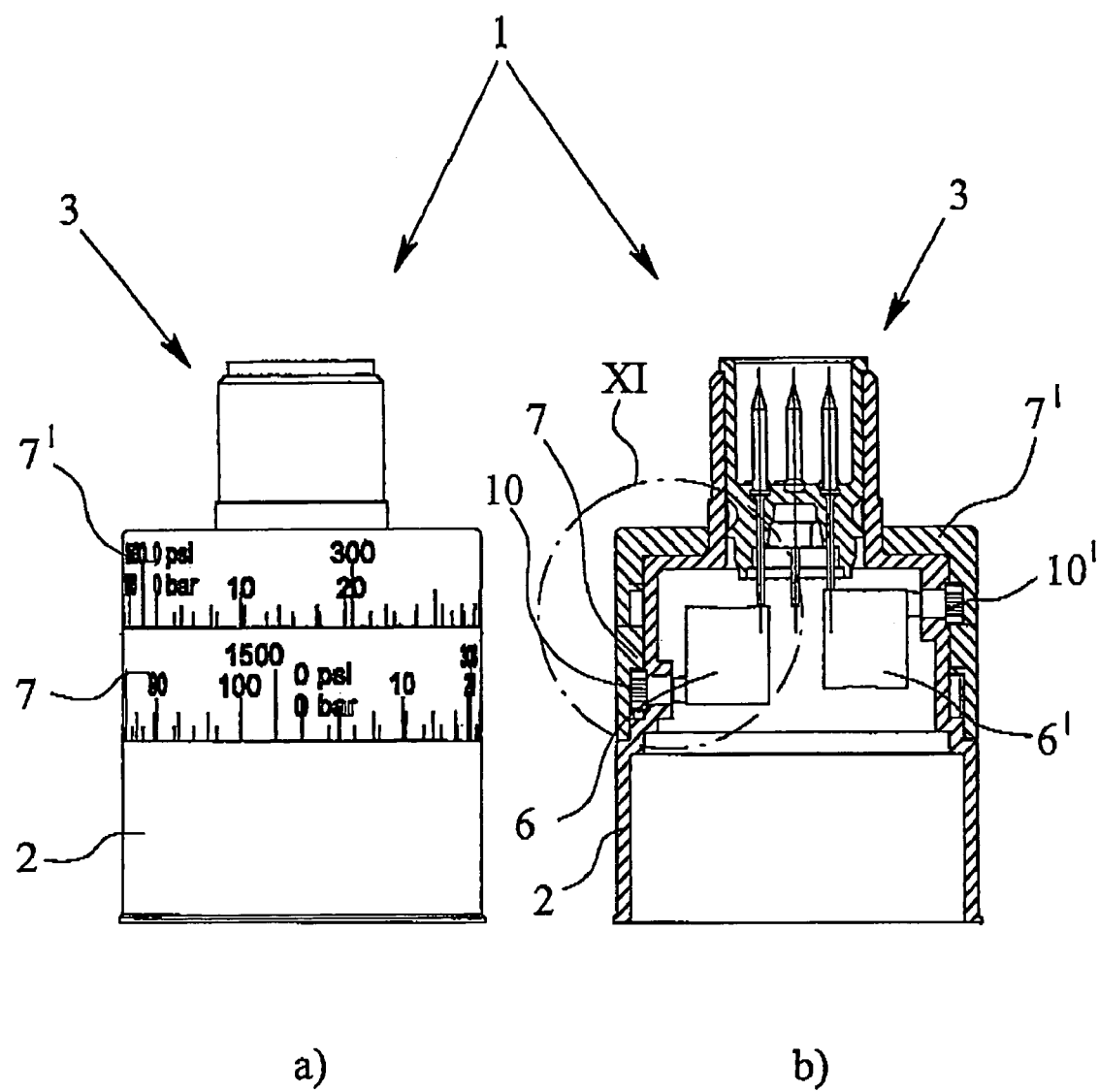
FIGS. 10a & 10b show a fourth embodiment of a measurement device of the invention with a cylindrical housing, in an elevational view and in a lengthwise sectional view, respectively.
Figure 11:
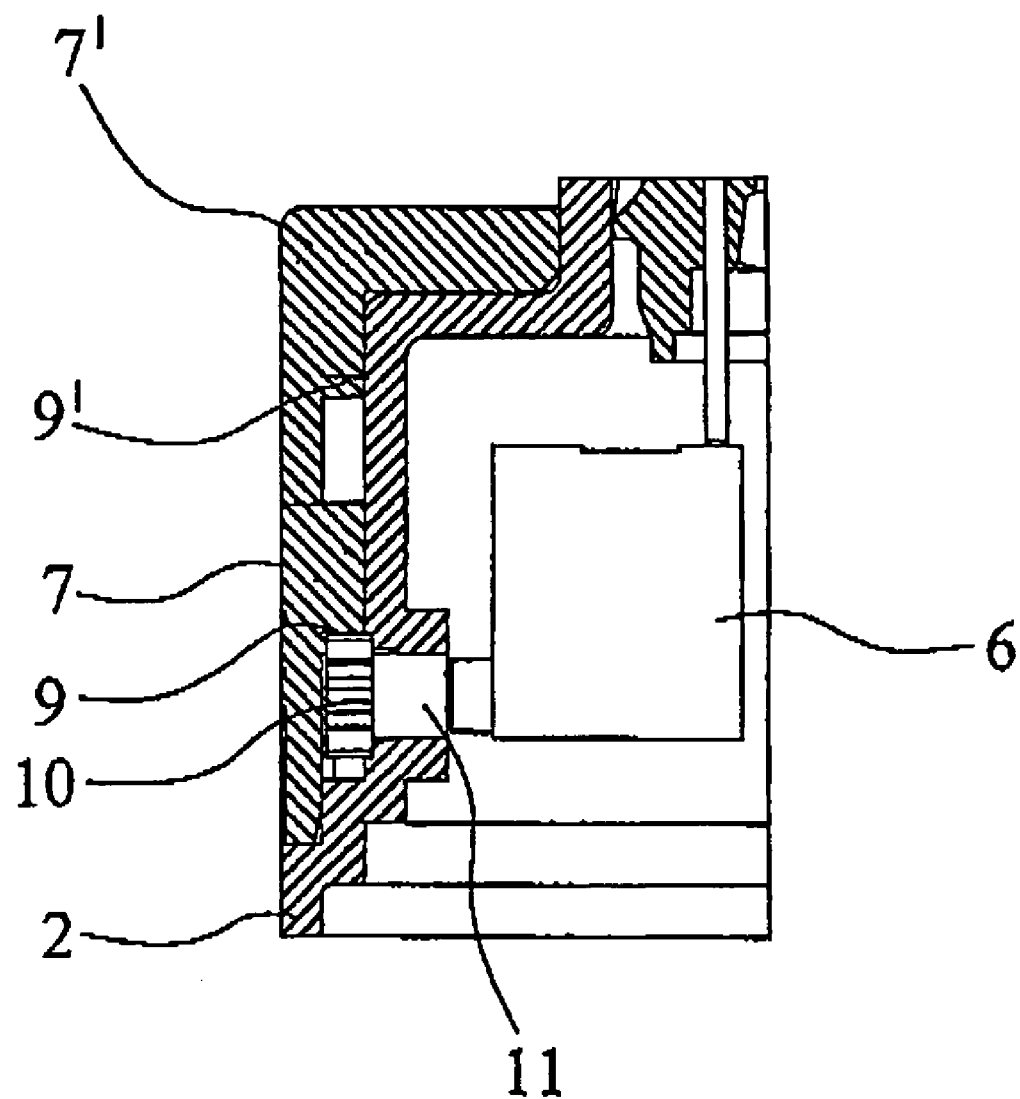
FIG. 11 shows an enlargement of detail XI of the measurement device as shown in FIG. 10, FIGS. 12a & 12b show another embodiment of a measurement device as in accordance with the invention with a cylindrical housing, in an elevational view and in a lengthwise sectional view, respectively.
Figure 12:
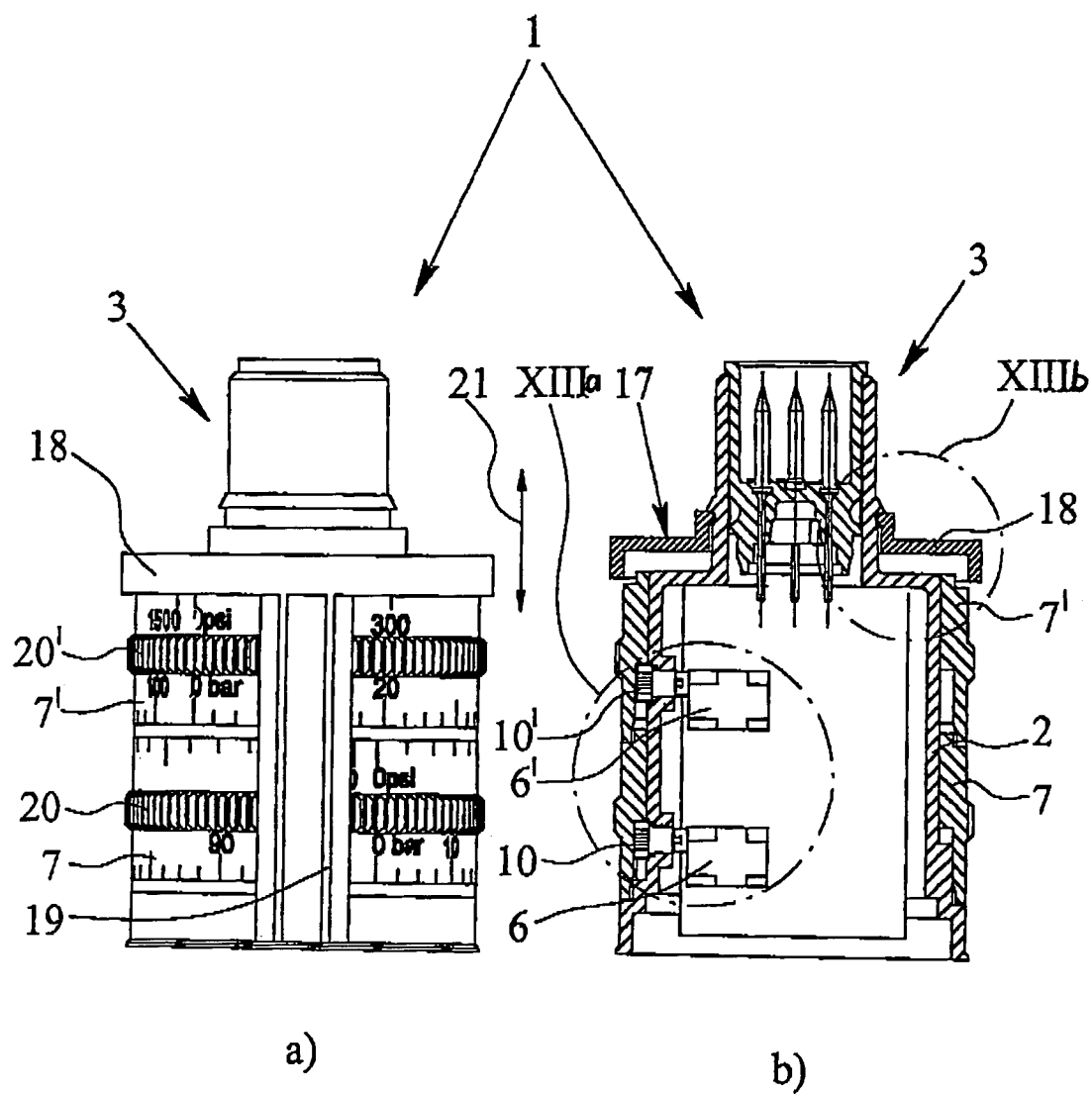
Figure 13:
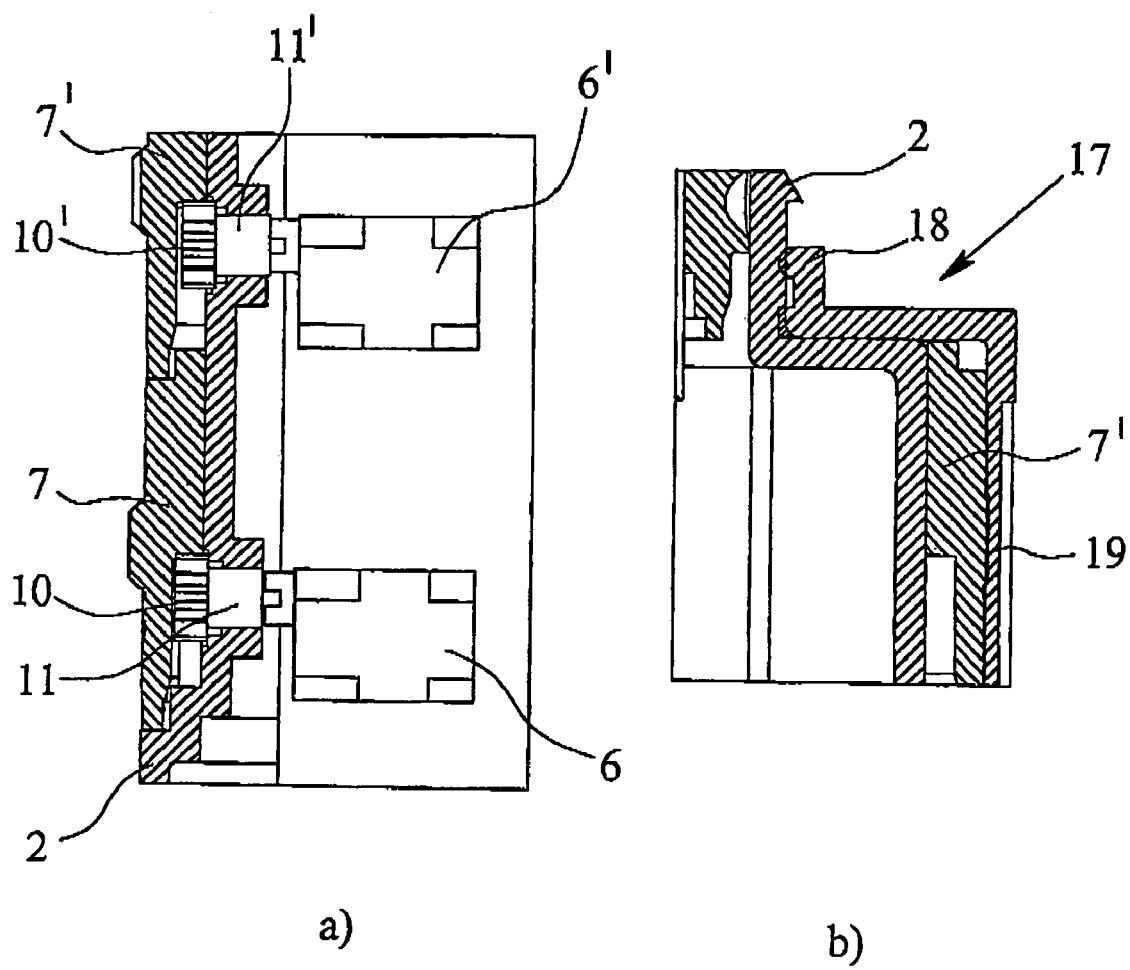
FIGS. 13a & 13b shows an enlargement of details XIIIa and XIIIb of the measurement device shown in FIG. 12, FIGS. 14a & 14b show a last embodiment of a measurement device of in the invention with a cylindrical housing, in an elevational view and in a lengthwise sectional view, respectively.

While in the embodiment as shown in FIGS. 10 and 11, the two gears 10, 10' and the two adjustment elements 6, 6' are located on opposing sides within the housing 2, in the embodiment as shown in FIGS. 12 and 13, the two gears 10, 10' and the two adjustment elements 6, 6' are located on one side within the housing 2.

In the embodiment of the measurement device 1 shown in FIG. 14, the position of the housing sleeve 7 is transmitted to the adjustment element 6 in another but likewise mechanical manner. To do this, a journal 14 which projects into the interior of the housing 2 is made on the housing sleeve, the journal 14 being located such that it coincides with the axis of rotation of the housing sleeve 7. In the embodiment shown, the journal 14 interacts directly with the adjustment element 6 which is made in turn as a potentiometer in that the end 15 of the journal 14 is a made as a screwdriver blade and fits into the screw slot of the setscrew of the adjustment element 6. FIG. 14, moreover, shows that, as a result of the arrangement of the journal 14 which lies in the axis of the measurement device 1, the plug connection is located laterally on the housing 2.

In addition to the direct connection of the journal 14 to the adjustment element 6 which is shown in FIG. 14 the journal 14 can also be connected to the adjustment element 6 via one or more shafts or gears, especially via a planetary gear. In this way, then the use of a multi-turn adjustment element 6 is possible. Basically in this version of the measurement device 1 it is possible to place on top of one another two housing sleeves 7 which each have one journal 14 which projects into the interior of the housing 2 for adjustment of two parameters.

In order to prevent unintentional shifting of the housing sleeve 7 and thus of the set parameter, there are different possibilities for locking the housing sleeve 7. In the measurement device 1 as shown in FIG. 9, there is a sleeve 16, the sleeve 16 reaching over the housing 2 and the housing sleeves 7, 7' to such an extent that the housing sleeves 7, 7' are accessible only after removing the sleeve 16. The sleeve 16 is used, at the same time, also as an additional mechanical protection of the measurement device 1 against dirt and moisture. To fix the sleeve 16, there can be a suitable catch connection between the sleeve 16 and the housing 2. If there is to be protection against unauthorized shifting of the housing sleeve 7, 7', the sleeve 16 can moreover also be sealed. In order to be able to read the set value on the housing sleeves 7, 7' with the sleeve 16 pushed on, the sleeve 16 consists of a transparent material.

Instead of the sleeve 16 which is shown in FIG. 9 and which surrounds the housing 2 over the entire periphery, there can also be only a partial sleeve 17 for locking as is shown in the embodiment as shown in FIG. 12. The component sleeve 17 is formed of an annular upper part 18 and a beam 19 which is connected to it and which runs parallel to the axis of the measurement device 1. The partial sleeve 17 thus covers the two housing sleeves 7, 7' only over a small area of its periphery so that the housing sleeves 7, 7' are still accessible with the partial sleeve 17 slipped on. In order to still enable locking of the housing sleeves 7, 7', the two housing sleeves 7, 7' each have a set of external teeth 20, 20' and the beam 19 of the partial sleeve 17 has two corresponding sets of internal teeth. If the two sets of external teeth 20, 20' are engaged to the sets of internal teeth of the beam 19, it is not possible to move the housing sleeves 7, 7', i.e., the housing sleeves 7, 7' are locked. Conversely, if the partial sleeve 17 is pushed somewhat axially according to FIG. 12b, in which the partial housing 17 is raised during alignment as shown in FIG. 12,—as is indicated by the arrow 21—the external teeth 20, 20' are no longer engaged with the internal teeth so that the housing sleeves 7, 7' can be turned. Just like the sleeve 16, the component sleeve 17 is made of transparent material so that the scale 8 can always be read. In order to further facilitate reading of the scale 8, there is a magnifier in addition in the sleeve 16 or in the crosspiece 19 of the partial sleeve 17.

Figure 2:
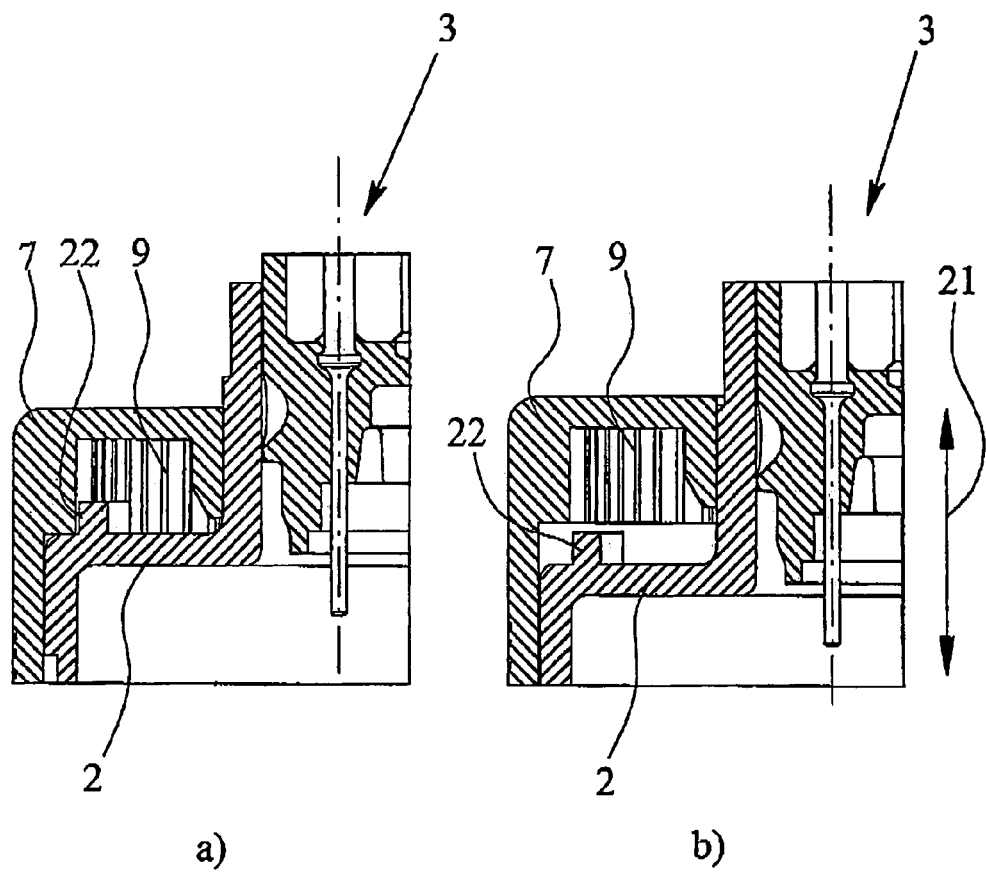
FIGS. 2a and 2b show an enlarged detail II of the measurement device shown in FIG. 1, in the locked and unlocked state of the housing sleeve, respectively.

In the measurement device 1 as shown in FIGS. 1 to 4, the housing sleeve 7 is locked by there being fixing teeth 22 on the housing 2 which are engaged with the internal teeth 9 on the housing sleeve 7 in the first position (locking position) which is shown in FIG. 2a so that turning of the housing sleeve 7 is not possible. Conversely, if the housing sleeve 7 is raised, the locking is released since then the fixing teeth 22 are no longer engaged with the internal teeth 9 of the housing sleeve 7. This unlocked state of the housing sleeve 7 is shown in FIG. 2b, the axial movability of the housing sleeve 7, in turn, being indicated by an arrow 21.

Both the sleeve 16 in the measurement device 1 as shown in FIG. 1 and also the partial sleeve 17 in the measurement device 1 as shown in FIG. 12 can be held using the corresponding catch between the sleeve 16 or the component sleeve 17 and the housing 2 in the unlocked position so that simple turning of the housing sleeve 7 in the unlocked position is possible. Because, in the unactuated state (normal state), the housing sleeve 7 is located in the locking position which is shown in FIG. 2a, unintentional shifting of the parameter is prevented by turning the housing sleeve 7.

According to an alternative embodiment of the invention which is shown in FIGS. 15 to 17, for setting the parameter of the measurement device 1, there is at least one slide 23 which can be moved in the lengthwise direction of the housing 2 and in the housing 2 at least one lengthwise slot 24 is formed for guiding the slide 23. The slide 23 is connected to the adjustment element 6. The adjustment element 6 can be, for example, a slide potentiometer so that the slide 23, which can then also be called a slide head, is connected directly to the potentiometer. The housing 2 can, basically, be made both cylindrical and also rectangular. Generally however, the alternative approach with the slide 23 is used preferably in a rectangular housing 2 as is also shown in FIGS. 15 to 17.

For display of the current measured value and also of the set parameter value, in the housing 2 there are several LEDs 25. Adjacent to the LEDs 25 there is a scale 26 which in the embodiments shown in FIGS. 15 and 16 is made as a "double scale", i.e., the scale 26 is labeled in two different units.

In contrast to the embodiment of the measurement device 1 as shown in FIG. 15, the measurement device 1 as shown in FIG. 16 has two slides 23, 23' and two rows of LEDs 25, 25' so that two parameters can be set in this measurement device 1. In this way, for example, two operating points or one operating point and the hysteresis can be set independently of one another. Using the LEDs 25, 25', both the current measured value and also the set parameter value or values, for example, the upper and low boundary value, are displayed. Here, the current measured value can be displayed on one row of LEDs 25 and the operating points on the other row of LED's 25'. In this way, a user for the measurement device 1 shown in FIG. 16 can read at a glance not only the current measured value, but also at the same time, the set upper and lower operating point, and thus, the distance of the current measured value from the operating points.

The parameter can be set easily and accurately by the execution of the slide 23 as of the invention on the housing 2 without the dimensions of the measurement device 1 being significantly increased.

Finally, FIG. 17 also shows that there is a cover cap 27 which is slipped onto the side of the housing 2 on which the slides 23 are located. The cover cap 27, which is made of a transparent material, prevents unintentional movement of the slide 23 and thus unintentional changing of the set parameter. Instead of the slip-on version, the cover cap 27 can also be connected to the housing 2 of the measuring device 1 via a hinge so that the cover cap 27 can be opened and closed in the manner of a pivoting cover.

What is claimed is:

1. Measurement device comprising:
 a cylindrical housing with a sensor element located therein and
 an adjustment element for setting at least one parameter of the measurement device,
 wherein at least one setting element is provided for setting the at least one adjustment element, said setting element comprising a rotary sleeve mounted over a portion of said cylindrical housing, and
 wherein at least one scale is provided on at least one of an outer surface of the housing and the sleeve for indicating a value of the parameter set based on the position of the sleeve relative to the housing wherein the rotary sleeve has internal teeth, wherein a gear is provided within the housing, the gear having external teeth for co-acting with said internal teeth, and wherein the gear interacts with the adjustment element.

2. Measurement device as claimed in claim 1, further comprising means for transmitting the position of the rotary sleeve on the housing to the adjustment element.

3. Measurement device as claimed in claim 1, wherein the gear is connected via a shaft to the adjustment element.

4. Measurement device as claimed in claim 1, wherein the internal teeth are axially oriented on the rotary sleeve and wherein the axis of the gear is located parallel to the lengthwise axis of the housing.

5. Measurement device as claimed in claim 4, wherein there are two rotary sleeves and two gears, the internal teeth of the two rotary sleeves being arranged concentrically to one another.

6. Measurement device as claimed in claim 5, wherein the two gears are located axially and radially offset relative to one another.

7. Measurement device as claimed in claim 1, wherein the internal teeth are radially oriented in the rotary sleeve, wherein the external teeth of the gear are radially oriented and the axis of the gear is located perpendicular to the lengthwise axis of the housing.

8. Measurement device as claimed in claim 7, wherein there are two rotary sleeves and two gears, the internal teeth of the two housing sleeves and the two gears being located axially offset relative to one another with respect to an axis of rotation of the rotary sleeves.

9. Measurement device as claimed in claim 8, wherein a locking mechanism is provided for locking the rotary sleeve.

10. Measurement device as claimed in claim 9, wherein the locking mechanism comprises a sleeve or partial sleeve, the sleeve or partial sleeve at least partially extending over the housing or the rotary sleeves.

11. Measurement device as claimed in claim 10, wherein the sleeve or the partial sleeve is made of a transparent material and comprises a magnifier.

12. Measurement device as claimed in claim 1, wherein a locking mechanism is provided for locking the rotary sleeve.

13. Measurement device as claimed in claim 1, wherein said teeth lock the rotary sleeve on the housing and wherein the rotary sleeve is axially movable for disengaging the internal and external teeth and thereby enabling adjusting of a parameter.

14. Measurement device as claimed in claim 1, wherein the sensor is at least one of a potentiometer, a flow sensor or monitor, a pressure sensor, and a temperature sensor.

* * * * *